Figure 1:
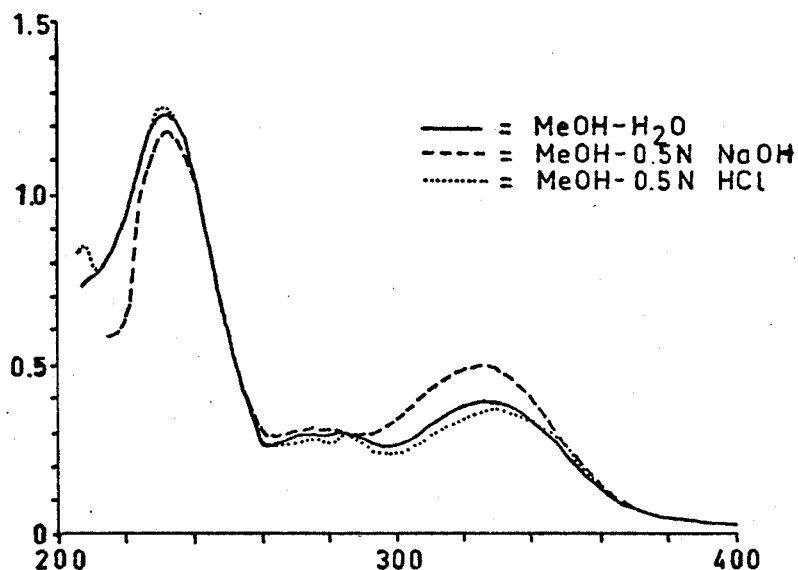

United States Patent [19]

Vos et al.

[11] 4,062,948

[45] Dec. 13, 1977

[54] DIHYDROMOCIMYCIN ANTIBIOTICS

[75] Inventors: Cornelis Vos, Pijnacker; Jacobus Den Admirant, Delft; Jan Lambert van Os, Voorburg; Hendrik Marten Jongsma, Delft; Hermanus Jacobus Kooreman, Maassluis, all of Netherlands

[73] Assignee: Gist-Brocades N.V., Delft, Netherlands

[21] Appl. No.: 612,542

[22] Filed: Sept. 11, 1975

Related U.S. Application Data

[63] Continuation-in-part of Ser. No. 344,610, March 26, 1973, Pat. No. 3,927,211, which is a continuation-in-part of Ser. No. 170,516, Aug. 10, 1971, abandoned.

[30] Foreign Application Priority Data

May 16, 1975 United Kingdom ............... 20926/75
July 22, 1975 United Kingdom ............... 30646/75
Aug. 14, 1970 United Kingdom ............... 39367/70

[51] Int. Cl.$^2$ .......................... A61K 31/70; C07H 7/00
[52] U.S. Cl. ................................... 424/180; 195/80 R; 260/295 R; 424/181; 536/1; 536/53; 542/420; 542/421
[58] Field of Search ........ 260/295 R, 210 AB, 240 H; 424/122, 181; 195/80; 536/17, 1, 4

[56] References Cited

U.S. PATENT DOCUMENTS 3,927,211 12/1975 Vos et al. .............................. 424/122

OTHER PUBLICATIONS

Meltzer, "Chem. Abst.", vol. 79, 1973, p. 130ls.
Badger, "Chem. Abst.", vol. 42, 1948, p. 161(b).
Saucy et al., "Chem. Abst.", vol. 49, 1955, p. 2465(a).

*Primary Examiner*—Johnnie R. Brown
*Attorney, Agent, or Firm*—Hammond & Littell

[57] ABSTRACT

A new antibiotic (now called dihydromocimycin) being a yellow, salt-forming weak acid and its non-toxic, pharmaceutically acceptable salts produced by a novel microorganism called *Streptomyces ramocissimus*, a sample of which is deposited in the collection of "Centraal Bureau voor Schimmel-cultures" at Baarn, The Netherlands, under No. CBS 190.69, or mutants thereof, which antibiotic has antibacterial properties and has been found to be effective against Treponema dysentry, one of the most common swine diseases. Dihydromocimycin may also be converted into mocimycin which is an antibiotic which also possesses growth-promoting properties when added to animal feeds by a dehydrogenation reaction using selenium dioxide as the dehydrogenating agent. The dehydrogenation reaction may be carried out in the presence of a suitable organic solvent.

16 Claims, 10 Drawing Figures

DIHYDROMOCIMYCIN ANTIBIOTICS

PRIOR APPLICATIONS

This application is a continuation-in-part application of copending application Ser. No. 344,610 filed Mar. 26, 1973, now U.S. Pat. No. 3,927,211, which in turn is a continuation-in-part application of Ser. No. 170,516, filed Aug. 10, 1971, now abandoned.

OBJECTS OF THE INVENTION

It is an object of the invention to provide a novel antibiotic having antibacterial activity.

It is another object of the invention to provide a novel process for the preparation of the novel antibiotic.

It is a further object of the invention to provide novel antibacterial composition.

It is a further object of the invention to provide another novel antibiotic being active against Treponema diseases in swine.

It is a further object to provide pig feedstuffs useful against Treponema disease in swine.

It is a further object to provide a process for administering to pigs suffering from Treponema disease with dihydromocimycin.

It is a further object to provide a process for the dehydrogenating of dihydromocimycin into mocimycin by means of selenium dioxide.

These and other objects and advantages of the invention will become obvious from the following detailed description.

THE INVENTION

The new antibiotic, referred to as MYC 8003 (now called mocimycin), is of special value for its growth-promoting properties when administered to live-stock. It also has a considerable activity in vitro against organisms of the Mycoplasma genus (pleuro-pneumonia like organisms) and is active against some bacteria, for example *Actinobacillus equuli*. It is obtained from culture media of the microorganism which is characterized in detail hereafter belonging to the genus Streptomyces. The microorganism producing the antibiotic has not been described hitherto, and a specimen of it has been deposited in the collection of "Centraal Bureau voor Schimmelcultures" at Baarn, The Netherlands, where it has been given the number CBS 190.69 and is available to the public.

The species of Streptomyces described herein and identified as Streptomyces MYC 8003 includes all strains of Streptomyces which produce antibiotic MYC 8003 and which cannot be definitely differentiated from the strain CBS 190.69 and its subcultures, including mutants and variants. By the term "mutants" as used herein there is intended mutants produced from the described organisms by various means such as chemical mutagenic agents, ultra-violet radiation, X-radiation, phage exposure and the like. The properties of antibiotic MYC 8003 are described herein and after these properties are known it is easy to differentiate the strains producing antibiotic MYC 8003 from others.

The novel microorganism has been called *Streptomyces ramocissimus*.

The antibiotic of the present invention is a weak acid and forms non-toxic, pharmaceutically acceptable salts, which are antibiotically active, such as alkali metals, e.g. sodium and potassium, ammonium and amine salts. It has the following physico-chemical properties.

Solubility

The solubility of the antibiotic is good in chloroform, methyl isobutyl ketone, butyl acetate, ethyl acetate, acetone, methanol and alkaline solutions. The solubility is poor in carbon tetrachloride and benzene, and the antibiotic is insoluble in diethyl ether, petroleum ether, water and acid solutions.

Stability

Tests have shown that, over periods of about 4 hours at ambient temperature, the antibiotic when dissolved in 50% aqueous methanol is stable within a pH range of 3 to 12. The solid antibiotic stored at 25° C and 37° C at low relative humidities shows no loss in activity for at least 5 months. It is stable for 3 months at 25° C and 100% relative humidity and for 2 months at 37° C and 100% relative humidity.

Reactions on possible function groups

TABLE I

| Reagent | Result |
|---|---|
| Conc. Sulfuric acid | dissolution and formation of a red colour |
| Aromate test (AlCl$_3$ + chloroform | slightly positive |
| Fehling's reaction (aldehydes) | negative |
| Tollens' reaction (aldehydes) | negative |
| Molisch reaction (saccharides) | negative |
| Anthron reaction (saccharides) | negative |
| Biuret reaction (proteins) | negative |
| Folin L reaction (proteins + amino acids) | negative |
| Pauly reaction (amino acids + phenols) | dark brown colour |
| FeCl$_3$ reaction (enols + phenols) | dark red colour and turbidity |
| Bromination in CHCl$_3$ | positive |
| Bromination in water | precipitation due to acid formation |

Optical rotation $[\alpha]_D^{22} = -60°$ (1 % methanolic solution)

Melting point

The antibiotic does not have a sharp melting point or melting range. At 135° C, a gas production takes place, while the antibiotic softens. At about 152° C, gas is again produced. At 164°–174° C, the antibiotic is molten.

Ultra-violet Spectrum

The antibiotic shows a specific spectrum with maxima at a wave-length of 233, 276, 286 and 327 nm. At different pH values, different spectra are obtained as shown in FIG. 1. In FIG. 1, the solid line stands for a 13 mg/l solution of the antibiotic in a mixture of equal amounts of methanol and water and the broken line stands for a similar solution, except that the water is replaced by 0.5N sodium hydroxide, while the dotted line stands for a similar solution except that the water is replaced by 0.5N hydrochloric acid.

Figure 2:
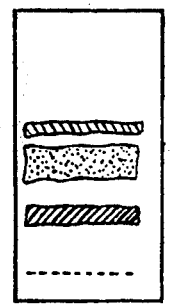
Figures 5, 6:
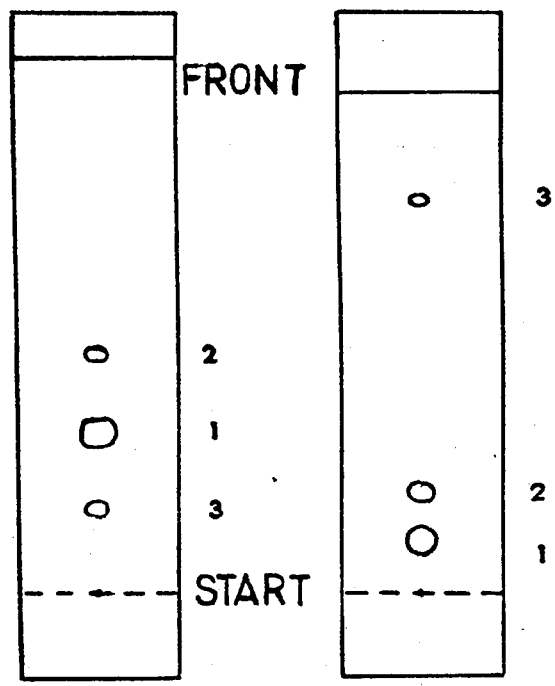

Thin-layer chromatography of the antibiotic reveals the presence of three compounds. By two-dimensional chromatography where the second elution was carried out at least 12 hours after the first, it was found that these three components are in equilibrium with each other. The results obtained with three solvent systems are given in FIGS. 2, 5 and 6.

The first chromatogram (FIG. 2) has been made on silica gel with the solvent mixture consisting of acetone, ethyl acetate and water (12:8:1). The dotted line indicates the start, and the spots 1, 2 and 3 indicate the components.

The second chromatogram (FIG. 5) is obtained with the solvent system methyl isobutyl ketone, acetone and water (50:45:5) and the third (FIG. 6) with benzene, ethanol and 33% ammonia (65:40:9). For the chromatograms of FIGS. 5 and 6, Kieselgel F 254 plates (Merck) were used. The spots are detected by using UV light of a short wave length giving dark spots on a fluoroescing back ground. The $R_f$ values obtained are: first component (chief component): 0.5, 0.29 and 0.10, second component,: 0.7, 0.44 and 0.20 and third component: 0.3, 0.16 and 0.76, respectively.

Infra-red Spectrum

Figure 3:
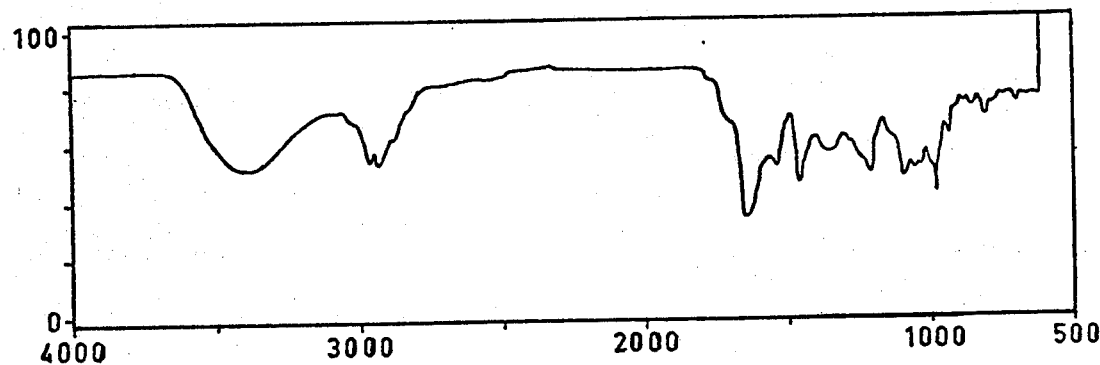

The I.R. spectrum in KBr of the antibiotic is shown in FIG. 3. The principal absorption bands are 812, about 860, 940, 985, 1092, 1215, 1340–1380, 1460, 1540, 1640, 2933, 2969, about 3370 cm$^{-1}$.

The IR spectrum of a solution in chloroform shows the following absorption maxima: 865, 940, 990, 1045, 1077, 1095, 1360, 1460, 1520, 1658, 2880, 2940, 2973 and 3448 cm$^{-1}$.

PMR Spectrum

Figure 4:
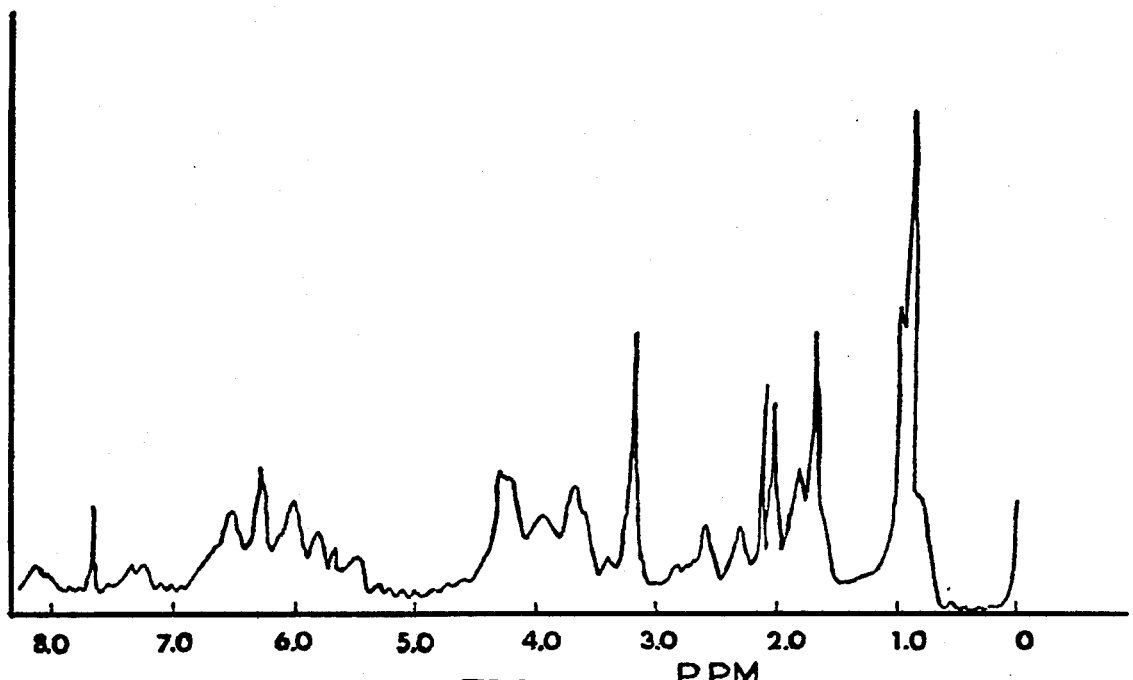

The PMR spectrum of MYC 8003 was taken in a mixture of hexadeutero-dimethylsulfonamide and CDCl$_3$ and measured at 60 Mc and is shown in FIG. 4. δ values are indicated in ppm and tetramethylsilane was used as a reference.

Elementary Analysis

Average values found are:
C 63.8% H 7.6% N 3.5% O (by difference) 25.1%.

Molecular Weight

The molecular weight determination was carried out by means of isothermic distillation. Two solutions, one of the antibiotic in acetone and the other of azobenzene (as reference) in acetone, were placed separately in a closed and evacuated system. Because of the difference in vapor tension above the solutions, the vapor moves until an equilibrium is reached when the solutions have equal molarities. The method was carried out at a constant temperature of 23° C. The molecular weight calculated for the antibiotic was 714. A solution of the antibiotic in 50% aq.MeOH titrated by 0.1N NaOH gives a neutralization equivalent of 817.

Microbiological Activity

The microbiological activity of the antibiotic preparation towards a number of micoorganisms has been determined by a micro liquid serial dilution test:

A stock solution of the test compounds at a concentration of 200 μg/ml in 0.05 molar phosphate buffer at a pH of 6.5 was prepared and serial 1:1 dilutions were made with a liquid medium inoculated with the test organism, using conventional glass spot-test plates. The plates were incubated 18 hours at 30° C or 37° C. The minimum inhibitory concentration (MIC) which is the smallest concentration of compound completely inhibiting the growth of the test organism is read and calculated in μg/ml. The results are given in Table II.

TABLE II

| Organism tested | Minimum inhibitory concentration μg/ml |
| --- | --- |
| Bacillus subtilis ATCC 6633 | 50 |
| Bacillus cereus ATCC 9139 | 0.3 |
| Staphylococcus aureus A 55 (ATCC 65388) | 100 |
| Staphylococcus aureus A 321 | 100 |
| Staphylococcus aureus A 355') | 100 |
| Staphylococcus aureus L 160a') | >200 |
| Streptococcus haemolyticus A 266 | 2 |
| Streptococcus faecalis L 80 | >200 |
| Streptococcus faecalis A 306 | 1 |
| Micrococcus flavus A 54 | 4 |
| Sarcina lutea ATCC 9341 | 25 |
| Diplococcus pneumoniae A 188 | 1 |
| Brucella melitensis A 488 | 1 |
| Pasteurella multocida A 723 | 4 |
| Salmonella dublin P 43 | >100 |
| Salmonella typhimurium R 127 | >100 |
| Escherichia coli U 20 | >100 |
| Escherichia coli M | >100 |
| Escherichia coli NCTC 8196 | 50 |
| Erwinia caretovora W 9 | 6 |
| Pseudomonas aeruginosa L 94 | >100 |
| Pseudomonas aeruginosa 2396") | >100 |
| Proteus rettgeri A 821 | >100 |
| Proteus mirabilis H 3 | 50 |
| Proteus mirabilis L 93 | 100 |
| Proteus morganii 2241") | 100 |
| Haemophilus influenzae A 773 | 2 |
| Actinobacillus equuli T 3 | 1.5 |
| Candida albicans A 7 | >100 |
| Candida parapsilosis A 952 | >100 |
| Torulopsis glabrata A 420 | >100 |
| Saccharomyces cerevisiae D 160 | >100 |
| Trichophyton mentagrophytes R 177 | >100 |
| Aspergilus niger D 184 | >100 |
| Lactobacillus acidophilus D 218 | >100 |
| Clostridium welchii A 738 | 10 |
| Vibrio coli 1846 | 100 |
| Streptococcus agalactiae A 732 | 0.9 |
| Streptococcus disgalactiae A 730 | 0.6 |
| Mycoplasma gallisepticum K 514 | 0.1 |
| Mycoplasma synoviae A 2082 | 1 |
| Mycoplasma suipneumoniae A 2174 | 1 |
| Mycoplasma hyorhinus A 2230 | 3 | wherein ') indicates penicillinase-producer; ") indicates recently isolated hospital strain.

The Table shows that the antibiotic possesses a high activity against Mycoplasma gallisepticum, but almost no activity against a number of human-pathogenic microorganisms. There is no activity against Mycoplasma gallisepticum in vivo.

Toxicity

The toxicity of the antibiotic has been studied in various animals. The acute toxicity is very low; a dose of 1,000 mg/kg i.p. does not kill mice and oral administration to rats and chickens at concentrations up to 0.1% in the diet for three months does not result in any undesired pharmacological effect.

Application

The new antibiotic of the invention has been found to be especially useful as a growth promoting agent for livestock, e.g. cattle, pigs and poultry. The growth promoting agent can be administered in the usual manner, for example, as an additive in animal food at a daily rate of 1 to 100 mg/kg preferably 2.5 to 20 mg/kg. The antibiotic may also have therapeutical value for diseases caused by certain intestinal microorganisms, such as Vibrio coli, Clostridium welchii.

Description of the microorganism

The microorganism Streptomyces ramocissimus (CBS 190.69), which produces the antibiotic of the present invention is characterised by the following description, in which, for the determination, use has been made of "Systematik er Streptomyceten" by R. Hutter (1957) and the "International Journal of Sytematic Bacteriology" (1968), vol. 18 no. 2) with the rules for description prescribed by the International Streptomyces Project (hereinafter abbreviated to ISP).

A. The vegetative mycelium

The growth on most growth media is good. The colonies possess the characteristic appearance of Actinomycetes and are formed as leather-like, somewhat plied colonies. Normally, the color of the colonies is not very characteristic as it varies from substantially colorless via light gray and light beige to light yellow, except on media on which the colonies are colored brown to dark brown by formation of melanine B. The aerial mycelium On most media, an aerial mycelium is hardly or not visible macroscopically. On some media, such as yeast extract-malt extract agar, oat meal agar and, especially, inorganic salt-starch agar, however, aerial mycelium is formed in abundance. At first, such a mycelium is white, but is turns dark gray in good developments, and is built up from often rather short, irregularly branched hyphes having spore chains on short side axes in the form of simple loops or primitive coils having not more than two, three or four turns (section: Spira). Sometimes, two, three or four of those coils sprout as pseudo verticils from substantially the same spot on the main axes. Other spore chains sprout as primitive coils directly from the substrate mycelium (in a way similar to *Retinaculum-apertum*). In addition, many sub-globose bodies are often visible in the aerial mycelium, probably due to an amount of spores from a primitive coil surrounded by a film of liquid.

C. The conidia.

In the spiral-like hyphes, strings of mostly over ten, somewhat elliptic conidia are formed. The surface of the conidia is smooth. The sizes are rather variable, but the average sizes are about 0.9 to 1.3 $\mu$.

D. Influence of temperature on growth

The growth is slow at 20° C., moderate at 26° C., good between 30° C. and 37° C, and fairly good at 40° C. Growth stops over 42° C (mesophyl).

E. Physiological properties

The physiological properties are shown in the following Table III.

TABLE III

| Property | Diagnostic medium | Physiological reactions |
|---|---|---|
| Melanine formation | Melanine Medium according to Shinobu, 1958 (ISP med. 7) | highly positive |
| $H_2S$ formation | "Bacto-Peptone Yeast Extract Iron agar" | highly positive |
|  | "Triple Sugar Iron agar" from Difco | highly positive |
| Gelatin liquefaction | Plain Gelatin | liquefield completely after 16 days at 30° C. |
| Nitrate reduction | Nitrate Reduction Medium according to Waksman | highly positive |
| Diastatic action | Starch agar | highly positive |
| Coagulation and Peptonisation of milk | Litmus milk | after 16 days coagulated and, for the greater part, peptonised (pH 7.9) |

In Tables IV and V a survey is given of the growth and the appearance of the microorganism *Streptomyces ramocissimus* on a number of substrates.

TABLE IV

Appearance of the microorganism after 16 days' growth at 30° C.

| Substrate | Growth | Soluble pigment | Aerial mycelium | Vegetative mycelium |
|---|---|---|---|---|
| Malt peptone agar | good | dark brown | none | chocolate brown colored colonies |
| Emerson's agar | good | brown | none | light brown to beige colonies |
| Nutrient agar | good | brown | none | light brown yellow to yellow beige colonies |
| Nutrient agar + 1% soluble starch | good | brown | none | light brown yellow to yellow beige colonies |
| Oat meal agar | good | light brown | initially white, later on light grey | light beige to yellow beige |
| Starch agar | good | light yellow | none | light yellow to gray |
| Potato-glucose agar | good | dirty dark brown | none | rather deeply plied, dark brown colonies |
| Czapek-glucose agar | fairly good | none | none | light yellow to gray |
| Czapek-saccharose agar | fairly good | none | none | light grayish white |
| Czapek-glycerol agar | fairly good | none | none | light gray |
| Glucose asparagine agar | good | none | none | light yellow, merging colonies |
| Glycerol asparagine agar | good | none | very scarce at the edge of the colonies | weak light greenish gray |
| Glucose calcium malate agar | good | none | none | very light yellow to white |
| Sodium citrate agar | moderate | none | none | gray-beige |
| Brain-heart infusion agar | moderate | black brown | none | chocolate brown |
| Kuster-Williams | good | light | very | very light |

TABLE IV-continued

Appearance of the microorganism after 16 days' growth at 30° C.

| Substrate | Growth | Soluble pigment | Aerial mycelium | Vegetative mycelium |
|---|---|---|---|---|
| agar (viz. Nature 202 1964 p. 928) | | brown | scarce, gray-white | greenish beige |
| Bennett's agar | good | light brown | very scarce, white | light brown to beige |
| Potato slices | good | almost black | none | black brown, highly plied colonies |

TABLE V

The microorganism after 13 day's growth on media prescribed by ISP.

| Substrate | Growth | Soluble pigment | Aerial mycelium | Vegtative mycelium |
|---|---|---|---|---|
| A. at 30° C. | | | | |
| Yeast malt extract agar (ISP II) | good | none | rather abundant, white, later on light gray | light brown to beige |
| Oat meal agar (ISP III) | good | none | very scarce, chiefly along the edges | flat, very light yellow to gray colonies having edges growing very deep in the agar |
| Inorganic salts-starch agar (ISP IV) | good | none | abundant, light gray, later on almost black | flat, light gray to very light yellow beige colonies |
| Glycerol asparagine agar (ISP V) | good | none | rather abundant, light gray, later dark gray to almost black | light gray to light yellow gray colonies |
| B. at 37° C. | | | | |
| ISP II | good | none | rather abundant, light gray | colonies having edges growing rather deep in the agar |
| ISP III | good | none | rather abundant, white | flat, very light gray to light yellow gray colonies having edges growing deep in the agar |
| ISP IV | very good | none | abundant, dark gray, later in certain spots almost black | flat, light beige to light yellow beige colonies |
| ISP V | good | none | rather abundant, light gray, later dark gray to almost black | light gray to light yellow colonies |

A comparison of the properties and characteristics of Streptomyces ramocissimus CBS 190.60 with those of related strains of Streptomyces, such as Streptomyces tendae CBS 432.59, Streptomyces tendae CBS 565.68 and Streptomyces collinus Ist 301 (ETH 24.318), when grown on media recommended by ISP at 30° and 37° C., makes it apparent that Streptomyces ramocissiumus is different from those previously known strains of Streptomyces.

The aerial mycelium of Streptomyces collinus, under suitable circumstances, may grow to markedly long, little branched hyphes lying more or less horizontally over the colony, along which short, generally loop-formed spore-chains are implanted. This is in great contrast to the aerial mycelium of Streptomyces ramocissimus which is markedly short and highly irregularly branched. The colors of the two mycelia are also quite different. The aerial mycelium of Streptomyces ramocissiumus is gray to dark gray, whereas that of Streptomyces collinus is generally white, light yellow or cream-colored to only light gray-colored, and the substrate mycelium, especially when grown on "Basal mineral salts agar media" to which different carbon compounds have been added, is predominantly grayish for Streptomyces ramocissimus whereas that of Streptomyces collinus is light brown, brown red or even egg-yellow. Differences occur also in the physiological properties in nitrate-reduction, gelatin-liquefaction, the amount of starch hydrolysis and the decomposition of calcium oxalate and oxalic acid. These differences indicate that the microorganism cannot be arranged under Streptomyces collinus.

The differences between Streptomyces ramocissimus and the two above mentioned Streptomyces tendae are less than between Streptomyes ramocissimus and Streptomyces collinus. For example, the color of the aerial mycelium of Streptomyces ramocissimus shows only a small difference with that of Streptomyces tendae, while the spore-chains are often bent into hooks or loops. The spore-chains of the examined Streptomyces tendae, however, are generally longer than those of Streptomyces ramocissimus. The spore-chains of Streptomyces tendae generally rise up directly from the agar, whereas, although sometimes observed at the spore-chains of Streptomyces ramocissimus, too, the spore-chains of this strain are generally arranged as monopodial side-branches along short aerial hyphes. A more important taxonomical difference resides in the formation of a melanoidal pigment on the I.S.P. media 6 and 7 (the melanine medium according to Shinobu and the Peptone yeast extract agar, respectively). The examined Streptomyces tendae strains do not form a brown pigment on those media, whereas Streptomyces ramocissiumus is pronouncedly melanine-position. Other differences in physiological properties were observed in the following properties:

| | Streptomyces ramocissimus | Streptomyces tendae |
|---|---|---|
| nitrate reduction | positive | negative |
| liquefaction of gelatin | positive | negative |
| degree of starch hydrolysis | highly positive | weakly positive |
| decomposure of calcium oxalate and oxalic acid | negative | positive |

Based on the above mentioned difference, it is apparent that Streptomyces ramocissimus does not belong to Streptomyces tendae.

Production of the antiboitic MYC 8003.

According to a feature of the present invention, the new antibiotic is prepared by the process which comprises aerobically cultivating the microorganism *Streptomyces ramocissimus* (CBS 190.69), or antibiotic-producing mutant thereof, in an aqueous nutrient medium containing assimilable sources of carbon, nitrogen and inorganic substances at a temperature between about 20° and about 40° C, preferably between about 28° and 40° C and a pH between about 5 and 9, preferably between about 6.5 and about 8, and separating the antibiotic formed during the cultivation.

Fermentation of the microorganism may be carried out with the liquid media containing the usual carbon, nitrogen, phosphorus calcium, iron, sulfur, magnesium, potassium, vitamin and trace-element sources, such as media containing molasses, malt paste, peanut flour, lactose, potato starch, corn steep, and yeast extract.

The separation of the antibiotic from the culture medium can be carried out in several ways. For example, the culture filtrate may be extracted with an organic solvent for the antibiotic such as butanol, chloroform, or, preferably, methyl isobuty ketone whereby the antibiotic is collected in the organic phase. Another method of recovery consists in extraction of the culture as such or at an adjusted pH value (whole broth extraction) with a suitable organic solvent (chloroform, methyl isobutyl ketone, butyl acetate, etc.) Still another method consists in adding a large volume (e.g. 0.5 to 5 times the culture volume) of an organic solvent such as an alcohol or ketone to the culture broth, followed by filtration or centrifugation. From the organic phase the antibiotic may be precipitated by concentration or addition of a poor solvent for the antibiotic such as petroleum ether. The pH for an optimal extraction is about 5 to 8. Purification of the antibiotic may be carried out by chromatography on a $Al_2O_3$ column, partition chromatography, and/or countercurrent distribution, using methyl isobutyl ketone, ethyl acetate or a 1:1 mixture of ethyl acetate and diethyl ether as the mobile phase, and buffers of bicarbonate, phosphate or borate as the immobile phase.

For practical use as a feed additive for live-stock, the product isolated from the culture medium by extraction and precipitation may be used without further purification.

The invention further relates to another new antibiotic related to mocimycin. It has been found that in the production of mocimycin by fermentation using the microorganism *Streptcymes ramocissimus*, another compound is formed additionally, having all the structural features of mocimycin except for the pyridone nucleus, which appears to have a saturated bond between the 5th and 6th carbon atoms. This novel compound is therefore henceforth referred to as dihydromocimycin.

According to another feature, the invention relates to the novel compound dihydromocimycin having the following structural formula

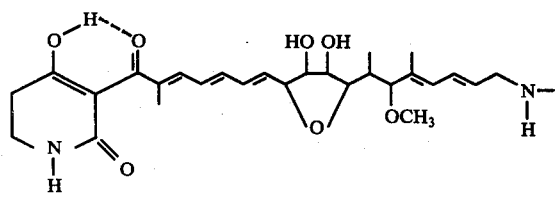

-continued

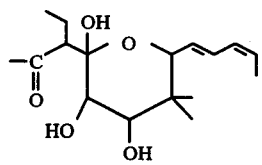

Dihydromocimycin is produced by fermenting *Streptomyces ramocissimus*, or suitable mutants thereof and is formed in addition to mocimycin. Dihydromocimycin is a pale yellow solid substance, weakly acid and further characterized by the following physico-chemical properties:

Solubility

The solubility of the compound is good in chloroform, methyl isobutyl ketone, ethyl acetate, butyl acetate, acetone, dioxan, methanol, ethanol, tetrahydrofuran, and in weakly alkaline aqueous solutions. The solubility is moderate in carbon tetrachloride and benzene, and the compound is insoluble in diethyl ether, water, weakly acid aqueous solutions, cyclohexane and petroleum ether.

Optical rotation $[\alpha]_D^{20} = -85°$ (1% methanolic solution).

Melting point

The compound does not melt, but decomposition starts at 123° C.

Elementary analysis

The following values were found:

|  | Found: | Calculated for $C_{43}H_{62}N_2O_{12} \cdot 2H_2O$ |
| --- | --- | --- |
| C: | 61.8% | 61.8% |
| H: | 7.5% | 8.0% |
| N: | 3.4% | 3.3% |
| O: | 27.2% (by difference) | 26.8% |

Ultra-violet spectrum

Figure 7:
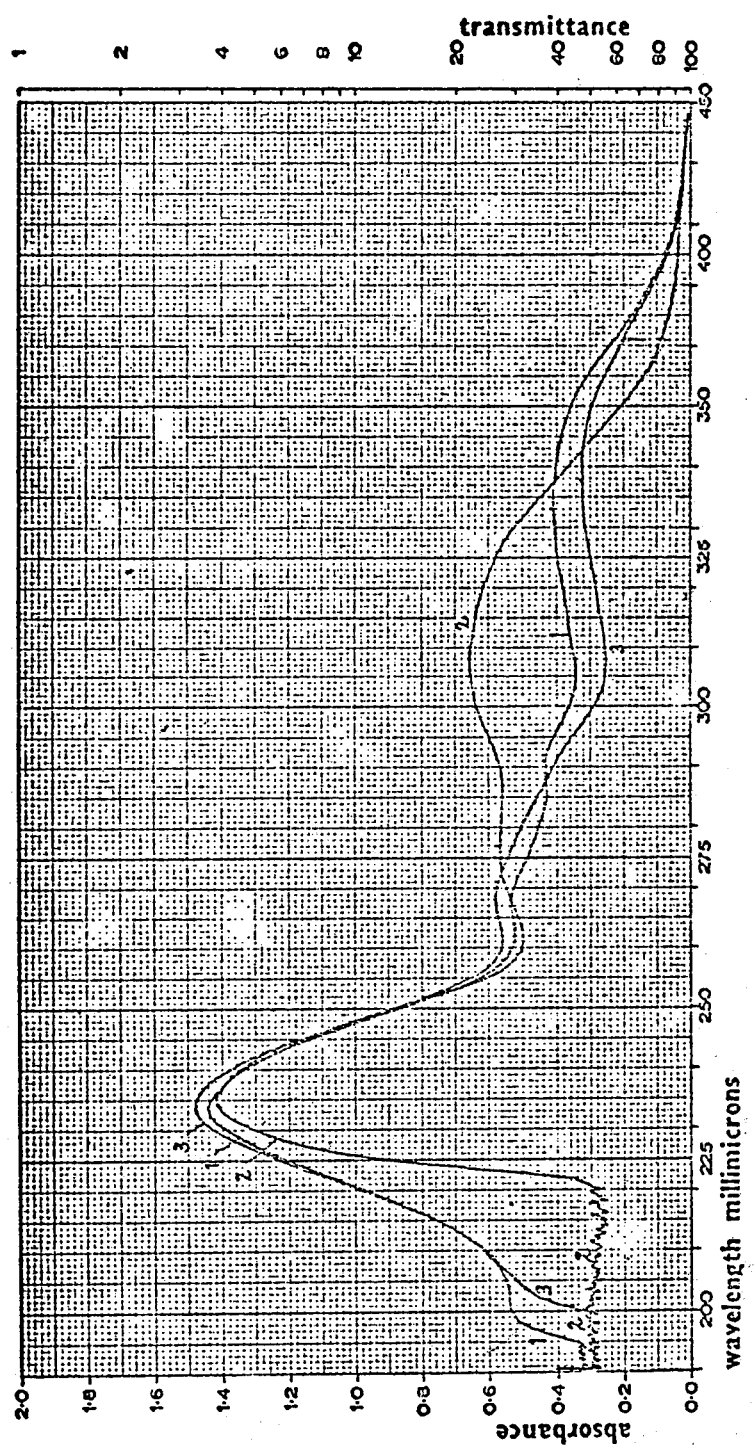

The ultra-violet spectrum of dihydromocimycin in a 1:1 mixture of water and methyl alcohol at various pH values is shown in FIG. 7 of the attached drawings. The concentration of the solutions measured was 18.3 μg/ml. The ultraviolet spectrum is dependent on the pH. The following maxima were found (the molecular extinctions are indicated between brackets):

| | |
| --- | --- |
| methanol - water: | 233.5 nm ($\epsilon$ = 63,000); 267 nm ($\epsilon$ = 23,000); 291 nm ($\epsilon$ = 19,000) and 333 nm ($\epsilon$ = 18,000); curve 1; |
| methanol - 0.5N NaOH: | 235 nm ($\epsilon$ = 62,000); 277 nm ($\epsilon$ = 25,000) and 308 nm ($\epsilon$ = 29,000); curve 2; |
| methanol - 0.5N HCl: | 233.5 nm ($\epsilon$ = 65,000), 268 nm ($\epsilon$ = 25,000) and 338 nm ($\epsilon$ = 14,000); curve 3. |

Infra-red spectrum

Figure 8:
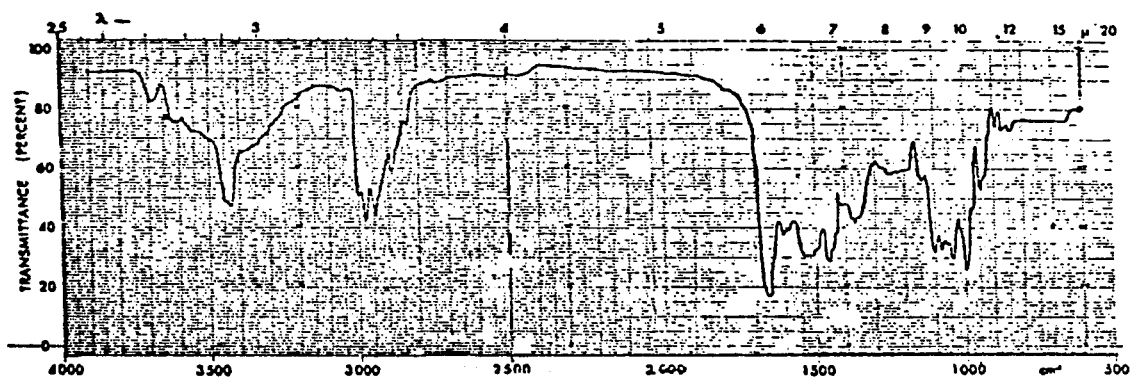
Figure 9:
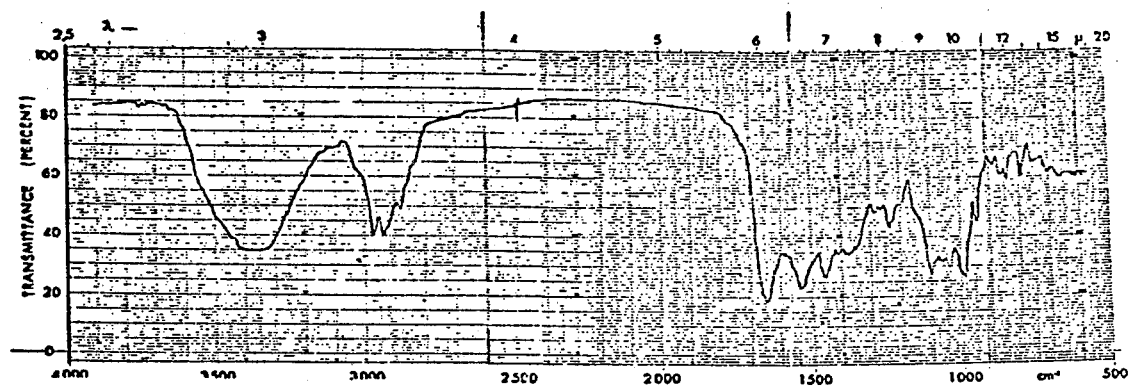

The I.R. spectrum of dihydromocimycin in chloroform and in potassium bromide is shown in FIGS. 8 and 9, respectively. The following principal absorptions were found:

chloroform ($\nu$in cm$^{-1}$): ±3445 (sh); 3430; 2979; 2941; 2886; 1662–1653, 1458; 1100; 1080; 1040; 998; 944; 893 870 and 840;

potassium bromide ($\nu$in cm$^1$): ±3400-3320; 2972; 2935; 2880; 1650; 1535; 1455; 1099; 1040; 990; 943; 860; 840; and 790.

PMR spectrum

Figure 10:
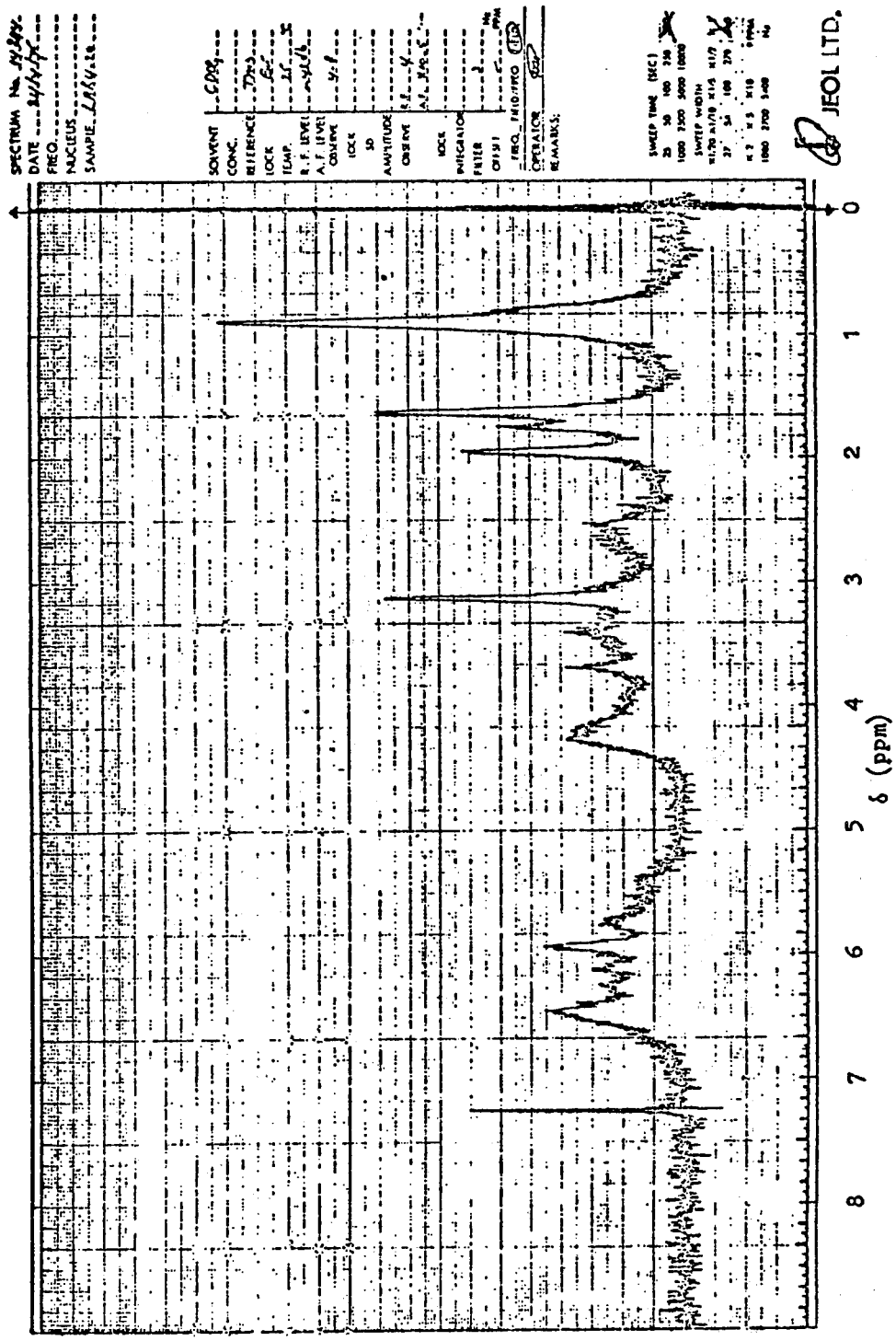

The PMR spectrum of dihydromocimycin dissolved in deutero-chloroform, using tetramethylsilane as the internal reference, is shown in FIG. 10 (60 Mc).

Thin layer chromatograhy

Thin layer chromatograms of dihydromocimycin were made on Kieselgel F 254 plates (Merck, ready-for-use plates), and after drying the spots were detected by fluorescence or by carbonization after spraying with a diethyl ether-sulfuric acid mixture. Investigations showed that the spot ascribed to dihydromocimycin, even the purest preparations, was always accompanied by a small additional spot. The appearance of the two spots is due to a tautomeric equilibrium, as can be shown by a two-dimensional chromatogram.

The following $R_f$-values were found for dihydromocimycin in various eluents (the $R_f$-value for the additional spot is indicated between brackets):

50:45:5 mixture of methyl isobutyl ketone, acetone and water: 0.44 (about 0.44);
70:20:10:0.5 mixture of ethyl acetate, methanol, water and 25% ammonia: 0.29 (0.36)
65:40:9 mixture of benzene, 100% ethanol and 33% ammonia: 0.16 (0.22)
60:42:10 mixture of chloroform, 96% ethanol and 25% ammonia: 0.4

The structural formula of dihydromocimycin is confirmed on the following grounds: The PMR spectra (220 Mc) of mocimycin (cf. Tetrahedron Letters 52 (1973) pp 5173-5176 for its structural formula) and dihydromocimycin showed that both compounds are similar, except that two doublets at $\epsilon$ 5.9 and 7.3 ppm (tetramethylsilane was used as the reference), which occurred in the spectrum of mocimycin, did not occur in the spectrum of dihydromocimycin. Those signals are caused by the protons of the 5th and 6th carbon atoms of the pyridone nucleus. However, two triplets appeared in the spectrum of dihydromocimycin at $\epsilon$ 2.5 and 3.4 ppm. This is an indication that the bond between the 5th and 6th carbon atoms in the pyridone nucleus of dihydromocimycin is saturated. This interpretation was confirmed by an ozonization of an aqueous solution of dihydromocimycin at pH 12 during 5 minutes at 0° C. After reduction of the reaction mixture obtained with hydrogen catalyzed by PtO$_2$ and after hydrolysis with concentrated hydrochloric acid, $\beta$-alanine was detected, indicating that the bond between the 5th and 6th carbon atoms of the pyridone nucleus of dihydromocimycin is saturated.

Many properties of dihydromocimycin are similar to those of mocimycin. However, there is one important difference: a low concentration of mocimycin added to the feed of animals being fattened, scuh as chickens or pigs, improves the growth and the feed-conversion markedly. Dihydromocimycin, on the contrary, does not show any improvement of the growth or feed-conversion of those animals, which is unexpected, since in vitro it shows activity against the same microorganisms as mocimycin; in many cases it shows even a better activity than mocimycin. A comparison of the antimicrobial activities of the two antibiotics is indicated in the following table:

| Agar dilution tests | | |
|---|---|---|
| | Minimum inhibitory concentration ($\mu$g./ml.) in anaerobic culture | |
| Organism tested | mocimycin | dihydromocimycin |
| *Staphylococcus aureus* A 2000 | >100 | >100 |
| *Staphylococcus aureus* A 2001 | >100 | >100 |
| *Diplococcus pneumoniae* L54 | 1.5 | <0.75 |
| *Salmonella typhimurium* R172 | >100 | >100 |
| *Escherichia coli* U20 | >100 | 100 |
| *Listeria monocytogenes* A2130 | 6 | 1.5 |
| *Listeria monocytogenes* A2131 | 6 | 6 |
| *Listeria monocytogenes* A2132 | 6 | 6 |
| *Clostridium perfringens* A738 | >100 | >100 |
| *Clostridium septicum* A2152 | 10 | 10 |
| *Streptococcus zocepidemicus* A2144 | 6 | 6 |
| R-Streptococcen A2148 | 6 | 3 |
| *Brucella suis* (smooth) A2126 | 0.75 | 0.4 |
| *Pasteurella haemolytica* A2136 | 3 | 1.5 |
| *Treponema spec.* A2275 | 30 | 10 |

| Liquid dilution tests | | |
|---|---|---|
| | Minimum inhibitory concentration ($\mu$g./ml.) | |
| Organism tested | mocimycin | dihydromocimycin |
| *Bacillus subtilis* ATCC 6633 | 100 | 50 |
| *Bacillus subtilis* ATCC 6051 | 100 | 50 |
| *Bacillus subtilis* 6346 D167 | 1.2 | 0.9 |
| *Bacillus subtilis* 220 D178 | 75 | 75 |
| *Bacillus subtilis* TH 10 | 100 | 50 |
| *Bacillus cereus* D166 | 0.6 | 0.6 |
| *Bacillus cereus* D261 | 0.9 | 0.6 |
| *Bacillus cereus* D220 | 1.2 | 0.9 |
| *Bacillus cereus* B569 | 2.5 | 1.2 |
| *Bacillus cereus* TH 1 | 1.8 | 1.2 |
| *Bacillus thuringiensis* W11 | 1.2 | 0.9 |
| *Bacillus mesenterium* D169 | 100 | 50 |
| *Bacillus cereus* var. mycoides | 1.2 | 0.45 |
| *Streptococcus haemolyticus* A266 | 0.45 | 0.45 |
| *Streptococcus haemolyticus* A2182 | 0.25 | 0.12 |
| *Mycoplasma hyorhinus* A2230 | 1 | 0.3 |
| *Streptomyces viridochromogenes* | 2.5 | 0.9 |

*Streptomyces ramocissimus,* under suitable conditions, does produce dihydromocimycin in addition to mocimycin, and therefore, according to a feature of the invention, dihydromocimycin is produced by the process which comprises aerobically cultivating the microorganism *Streptomyces ramocissimus* (CBS 190.69), or a dihydromocimycin-producing mutant thereof, in an aqueous nutrient medium containing assimilable sources of carbon, nitrogen, and inorganic substances, and separating the dihydromocimycin formed during the cultivation. Fermentation of the microorganism may be carried out with the liquid media containing the usual carbon, nitrogen, phosphorus, calcium, iron, sulfur, magnesium, potassium, vitamin and trace-element sources, such as media containing beet molasses, malt paste, peanut flour, lactose, potato starch, corn steep, and yeast extract. The temperature of the fermentation medium should be between 20° and 40° C. preferably between 26° and 34° C, and the pH between 5 and 9, preferably between 6.5 and 8.

It will be appreciated that the aforesaid process is similar to that for the production of mocimycin, and it has been found that dihydromocimycin is always formed in addition to mocimycin in the fermentation of *Streptomyces ramocissimus,* or its mocimycin- (and dinhydromocimycin) producing mutants. To obtain a greater yield of dihydromocimycin relative to that of mocimycin, it has unexpectedly been found that this is achieved to increasing the oxygen pressure in the culture medium.

From the structure of dihydromocimycin, it would be expected that a higher oxygen pressure in the culture medium would decrease the production of dihydromocimycin with respect to that of mocimycin. However, dihydromocimycin has been found to be produced more abundantly than mocimycin by better aeration of the culture liquid, which may be achieved by techniques known per se, such as a higher aeration rae (volume of air per volume of culture medium per unit of time), a higher agitation rate and culture medium in the fermenter. Suitable aeration rates of the culture medium, e.g. of about 2 liters, are 1 liter to 3 liters of air (preferably 1.5-2.5 liters) per minute. A further improvement of the yield of dihydromocimycin is obtained by adding low concentrations of certain metal ions, such as ions of iron, cobalt and nickel, to the culture medium.

The separation of dihydromocimycin from the culture medium is partially similar to the separation of mocimycin. In the last step, wherein the precipitation of the compounds is from an organic solvent, use is made of a difference in solubilities of mocimycin and dihydromocimycin. Mocimycin is precipitated first after passage of gaseous ammonia through the solution, and the separation may be carried out by introducing ammonia through the solution until substantially all mocimycin is precipitated, and substantially all dihydromocimycin is left in solution. This may be controlled, e.g. by thin-layer chromatographic tests. After separating, e.g. filtering off, the mocimycin precipitate from the solution, the passage of ammonia is continued until substantially all dihydromocimycin is precipitated so that it can be separated, e.g. filtered off. The ammonia is, for example, passed through the solution at a speed of about 150 liters per liter of solution per hour during about 1 to about 4 minutes (i.e. about 2.5 to about 10 liters of gaseous ammonia per liter of solution) at a temperature between about $-12°$ C to about $+15°$ C, preferably between $-5°$ C and $+8°$ C. Upon continued passage of the gaseous ammonia through the solution, the hydrogen ion concentration decreased sufficiently to make dihydromocimycin insoluble when the ammonia is passed with the above indicated speed during the 10 to about 15 minutes (corresponding to about 25 to about 40 liters of gaseous ammonia) under the same circumstances.

The crude dihydromocimycin thus separated from the culture medium is further purified from mocimycin by dissolving the precipitate in a highly diluted ammoniacal solution (pH 9) and extracting this solution with a solvent such as chloroform or methylene chloride. Mocimycin is poorly soluble in such a solvent, and by pouring the extract obtained into an excess of an apolar solvent (e.g. petroleum ether, cyclohexane or pentane) a precipitate is formed of dihydromocimycin containing less than 5% of mocimycin.

Highly purified dihydromocimycin can be obtained by passing the product obtained in the way just described over a SEPHADEX (Trade Mark) LH 20 column using the difference in adsorption of mocimycin and dihydromocimycin. The SEPHADEX is suspended in 100% methanol and poured carefully into the column. After displacement of the methanol with chloroform, the above-mentioned dihydromocimycin precipitate is brought into the column. The eluent used is chloroform. After some time, dihydromocimycin is obtained first followed by mocimycin. Both compounds can be detected in the eluate since they show absorption in the ultra-violet spectram at 350 nm. The pure compounds may be recovered from the chloroform by precipitation with an apolar solvent such as cyclohexane or pentane.

Confirmation of the identify of the compounds can be obtained by thin layer chromatography. Use is made of Kieselgel F 254 plates, size 20×5 cm.; (Merck). The eluent is a 60:42:10 mixture of chloroform, ethanol and 25% ammonia, respectively. Elution time 2 hours. Mocimycin shows an $R_f$ value of 0.3 (main tautomer) and dihydromocimycin shows an $R_f$ value of 0.4 (main tautomer).

In an early stage of investigation, it was presumed that mocimycin, having a similar anti-microbial spectrum to that of tylosin (Merck Index, 8th Ed. page 1089), might be effective against *Treponema hyodysenteriae* causing Treponema dysentery of Vibrio Doyle, one of the most common swine diseases. Experiments at that time showed that mocimycin was active against this disease, but not more so than tylosin. For that reason, no further investigations were carried out.

As indicated hereinbefore, dihydromocimycin was found to be more active than mocimycin against many microorganisms, and consequently an investigation with this substance was made against the microorganism causing Treponema dysentery. From the experiments, it appeared that dihydromocimycin posesses a markedly higher activity against the microorganism than tylosin and, in addition, was active against tylosin-resistant strains. Thus, dihydromocimycin may be regarded as being superior to tylosin (and also to mocimycin) in the treatment of Treponema dysentery.

According to another feature of the invention there are provided pig feedstuffs supplemented by a significant proportion of dihydromocimycin or a salt, e.g. sodium salt, thereof. The antibiotic or its alkali metal or ammonium or amine salt thereof may also be dispersed in, or mixed with, any suitable inert, physiologically innocuous carrier or diluent which is orally administrable to a pig, non-reactive with the antibiotic and not harmful to the pig on oral administration. Effective amounts of dihydromocimycin incorporated in a pig feedstuff for the prevention or treatment of Treponema dysentery are about 10 to about 200 ppm, preferably 20 to 40 ppm, of dihydromocimycin, based on the weight of the feed.

Dihydromocimycin obtained by the procedure hereinbefore described is a fine, easily dusting powder. This could lead to difficulties in the mixing procedure with the feed and, therefore, a premix is preferably made with one or more of the components of the pig feed containing, for example, a 9 to 99-fold amount of the dihydromocimycin. Suitable components for preparing the premix are, for example, corn flour, potato flour or soya flour. Experiments have shown that dihydromocimycin has a good stability against pelletizing (granulating under high pressure at high temperature, using steam).

The premix can be added to the feed as a prophylactic means or as a means for the treatment of pigs only lightly attacked with Treponema dysentery.

When pigs are attacked so heavily with Treponema dysentery that their appetite is lost, or that the sick pigs are pushed aways from the feeding trough by healthy pigs, dihydromocimycin is preferably administered through the drinking water. For that purpose, dihydromocimycin is transformed into a water-soluble form, such as a salt, e.g. a potassium, sodium, ammonium or amine salt.

Pigs badly attacked with dysentery may be treated by injection of dihydromocimycin or a water-soluble salt thereof, suspended or dissolved in a usual injection liquid, for example, saline, propylene glycol, glycerol-water mixtures etc.

Mocimycin shows advantageous growth-promoting properties when fed to live-stock including chickens and other fowl, but dihydromocimycin does not show the aforesaid properties. In addition, therefore, attempts have been made to convert dihydromocimycin into the, for this application, more useful mocimycin.

It has thus been found that dehydrogenation of dihydromocimycin is possible with a special dehydrogenating substance and procedure. Quinones, e.g. 2,3-dicyano-5,6-dichloro-1,4-quinone, p-chloranil and o-chloranil, are not satisfactory for the dehydrogenation of dihydromocimycin as other products are formed. Halogenation with cupric bromide, bromine, iodine or N-bromosuccinimie, followed by dehydrohalogenation, did not give the desired result either, even in the presence of catalysts such as benzoyl peroxide and $\alpha,\alpha$-azoisobutyronitrile. Attempts to dehydrogenate dihydromocimycin catalytically involve too high temperatures which would lead to decomposition of dihydromocimycin. Only one dehydrogenation agent, selenium dioxide, has been found to be useful for the dehydrogenation of dihydromocimycin.

Therefore, the present invention relates to a process for the dehydrogenation of dihydromocimycin into mocimycin, which comprises reacting dihydromocimycin with selenium dioxide. This process may advantageously be applied to mixtures of dihydromocimycin and mocimycin as obtained, for example, by the recovery of mocimycin from fermentation liquids in which it is formed.

The dehydrogenation of dihydromocimycin with selenium dioxide may be carried out at ambient temperature, but is preferably carried out at elevated temperatures, e.g. from about 65° to about 110° C, preferably from 80° to 95° C. The reaction time is from about 10 hours to about 20 minutes in the temperature range of about 65° to about 110° C, and is preferably from about 3 hours to about 1 hour in the preferred temperature range. At ambient temperatures, the reaction takes about a week.

The reaction is preferably carried out in a solvent medium. Suitable solvents are, for example, hexamethylphosphortriamide (HMPT), dimethyl sulfoxide (DMSO), t-butanol, t-amyul alcohol, sec-butanol, hexylene glycol, n-butanol, isopropanol, methylcellosolve, dimethylformamide, phenylmethylcarbinol and propanol, and mixtures of two or more of those solvents. Preferred solvents are HMPT, DMSO and t-butanol. The most preferred solvent is HMPT.

Based on the dihydromocimycin, a stoichiometric amount or an excess of selenium dioxide is preferred to carry out the dehydrogenation reaction.

Since isolation of both products together from the fermentation liquid is a simple procedure whereas the separation of dihydromocimycin and mocimycin is much more difficult, the discovery that dihydromocimycin may be converted by chemical means into — for the growth promotion valuable properties — mocimycin, even in a mixture of both compounds, leaving the latter compound substantially unaffected by the process, is very important. Therefore, isolation of the compounds is not necessary for the dehydrogenation of dihydromocimycin in mixtures containing dihydromocimycin and mocimycin.

In the following examples there are described several preferred embodiments to illustrate the invention. However, it should be understood that the invention is not intended to be limited to the specific embodiments.

EXAMPLE I

The microorganism *Streptomyces ramocissimus* (CBS 190.69) was fermented in 2,000 liters of a medium containing 20 g of malt paste, 10 g of yeast extract and 5 g of corn steep solids per liter at a pH of about 7 with agitation and aeration. After fermentaton, the culture medium was mixed with about 2% of dicalite as filter aid, and the mixture was filtered. The filtrate was acidified with 8N sulfuric acid to pH 6.0 and extracted twice with 1/5th of its volume of methyl isobutyl ketone and emulsions formed were broken with Hyflo Supercel filter aid. The organic liquids were mixed and concentrated to about 1 liter by evaporation under reduced pressure ane evaporation with a rotary evaporator. The concentrate formed was slowly added to 5 liters of petroleum ether (boiling range of 40° C to 60° C) and the precipitate formed was filtered off with a glass filter (D 3), washed with fresh petroleum ether and dried to obtain a yield of 78 g of a yellow colored powder, being mocimycin.

Using partition chromatography, 2 g of the crude antibiotic (in the acid form) was purified. The stationary phase used consisted of Hyflo impregnated with a 0.1 molar $Na_2CO_3/NaHCO_3$ buffer at pH 11, and the mobile phase consisted of a mixture of petroleum ether and butyl acetate. A yield of 0.828 g of the purified mocimycin having the physico-chemical properties hereinbefore described was obtained.

A certain amount of mocimycin was dissolved in water with addition of 0.1 N sodium hydroxide to pH 9 until a saturated solution was obtained. The solution was filtered and evaporated azeotropically with addition of butanol, and the butanolic residue was collected in a small amount of anhydrous butanol (in vacuo at about 45° C). To the stirred solution, petroleum ether was added dropwise until all the salt was precipitated. The precipitate was filtered off, washed and dried to give the sodium salt of mocimycin.

According to another feature of the invention there are provided animal feedstuffs, more especially in a form for use in feeding cattle, pigs, and poultry, supplemented by a significant proportion of mocimycin or a non-toxic, pharmaceutically acceptable salt, e.g. sodium salt, thereof. The antibiotic or salt thereof may also be dispersed in, or mixed with, any suitable inert physiologically innocuous carrier or diluent, which is orally administrable to an animal, non-reactive with mocimycin and not harmful to the animals on oral administration. Mocimycin or said salt thereof may be conveniently incorporated in the feedstuff, carrier or diluent by conventional methods such as milling, stirring or tumbling. Concentrates and supplements including mocimycin, which may be mixed with other components of animal feedstuff, are also within the invention. Generally the amount of mocimycin or salt thereof included in an animal feedstuff to give a satisfactory growth-promoting effect is about 1 ppm to 50 ppm by weight of the feedstuff. The following Examples illustrate the growth promoting effect of mocimycin.

EXAMPLE II

Slaughter chickens are given mocimycin in the form of the sodium salt obtained in Example 1, in a mixture with component of the feed (wheat flour), the amount of antibiotic in the feed (based on the weight of the feed) being as specified in the following Table, which gives the weight of the chickens after 3, 5 and 7 weeks.

TABLE VI

| Age | 3 weeks % increase | 5 weeks % increase | 7 weeks % increase |
|---|---|---|---|
| Control (0ppm) | 100 | 100 | 100 |
| 5 ppm | 104 | 103 | 103 |
| 10 ppm | 107 | 105 | 104 |
| 20 ppm | 109 | 107 | 105 |

The Table shows that an increase in growth of the chickens is obtained upon administration of mocimycin and an improvement of feed conversion of 3 to 5% is reached for the chickens in 7 weeks when the feed contains 1–50 ppm of antibiotic.

EXAMPLE III

The sodium salt of mocimycin as obtained in Example I, was pre-mixed with wheat flour which mixture, added to the feed, was administered to pigs. The amount of the antibiotic present in the feed (based on the weight of the feed) is given hereinbelow in Table VII, in which the average relative weights of the pigs after 6 and 12 weeks, respectively are given.

TABLE VII

| antibiotic | 6 weeks growth | 6 weeks feed conversion | 12 weeks growth | 12 weeks feed conversion |
|---|---|---|---|---|
| 0 ppm (control) | 100 | 100 | 100 | 100 |
| 5 ppm | 107 | 95 | 104.5 | 98 |
| 10 ppm | 108.5 | 92.5 | 104 | 99 |

The Table shows a growth promoting effect of mocimycin according to the invention.

EXAMPLE IV

Preparation of dihydromocimycin

From the concentrate formed according to Example I, a crude product was obtained by adding it to 5 times its own volume of petroleum ether (b.p. 40° to 60° C) and the precipitate formed was filtered off with a glass filter (D 3), was washed with fresh petroleum ether and dried to obtain a yellow colored powder containing mocimycin and dihydromocimycin.

A purified form of dihydromocimycin containing not more than 5% of mocimycin was obtained by passing gaseous ammonia through the concentrate at a rate of 150 liters per liter of concentrate per hour for 1 minute at a temperature of 2° C. A precipitate was formed which was filtered off. The filtrate was treated once more with gaseous ammonia during 10 to 15 minutes and the precipitate now obtained was dissolved in dilute ammonia (pH 9.0). Purified dihydromocimycin was obtained by extracting the solution in ammonia with an equal volume of methylene chloride. The extract was poured into 3 to 5 times its own volume of cyclohexane and the precipitate obtained was filtered, dried and powdered.

The sodium salt of dihydromocimycin was obtained by dissolving dihydromocimycin in water with addition of 0.1 N sodium hydroxide to pH 9 until a saturated solution was obtained. The solution was filtered and evaporated azeotropically with addition of butanol (in vacuo at about 45° C), and the butanolic residue was collected in a small amount of anhydrous butanol. Petroleum ether was added dropwise to the stirred solution until all the salt was precipitated. The precipitate was filtered off, washed and dried to give the sodium salt of dihydromocimycin. Other salts of dihydromocimycin were prepared in a similar manner.

EXAMPLE V

To obtain a higher yield of dihydromocimycin, a lyophilized culture of Streptomyces ramocissimus (CBS 190.69), or a well sporulated agar culture of the said microorganism, was used for inoculating the contents of a 500 ml Erlenmeyer flask containing 100 ml of a sterilized medium of the following composition: 20 g of malt paste, 10 g of yeast extract and 5 g of corn steep solids per liter of tap water, pH 7.0. After incubation on a rotating shaking device (300 rpm, stroke 2.5 cm) at 30° C for three days, the culture obtained was used for inoculating small fermenters containing 2000 ml of the above-mentioned medium to which 20 mg of $CoCl_2.6H_2O$ per liter were added. This growth phase, also effected at 30° C, was carried out under conditions of very good aeration in order to stimulate production of dihydromocimycin. For that purpose, more than 2 liters of sterile air were blown through the culture medium per minute, and the culture medium was stirred at a speed up to 1000 rpm. The production of dihydromocimycin started after a fermentation time of about 12 hours and was maximal after about 120 hours. Fermentation on a larger scale was possible by using a 48 hours old culture medium obtained in small fermenters as inoculum for large fermenters.

The dihydromocimycin so produced was recovered from the culture medium as follows: After addition of 2% of diatomaceous earth as a filter aid, the culture was filtered and the filtrate was acidified with 8N sulfuric acid to a pH of 5 to 6 and was extracted twice with 1/5th of its volume of methyl isobutyl ketone. If an emulsion formed, it was broken by filtration of the mixture after addition of some diatomaceous earth. The organic layers were collected and concentrated in vacuo to about 1/10th of the original culture volume. Gaseous ammonia was passed through the concentrate at a rate of 150 liters per liter of concentrate per hour for 1 minute. A precipitate was formed which is filtered off. The filtrate was treated once more with gaseous ammonia for 10 to 15 minutes. The precipitate then obtained was dissolved in dilute ammonia (pH 9.0) and purified dihydromocimycin (containing not more than 5% of mocimycin) was obtained by extracting the solution in ammonia with an equal volume of methylene chloride. The extract was poured into 3 to 5 times its own volume of cyclohexane and the precipitate obtained was filtered off, dried and powdered.

EXAMPLE VI

Twenty pigs, 3 months old, were infected with the microorganism causing Treponema dysentery by administering to them feed mixed with a homogenous mixture of contents of the intestines and intestinal mucous membranes of two animals suffering from the disease. The infected pigs were divided into four groups of five animals each and the animals were fed with the feed as a slurry diluted 1:1 with water for 1 week. The total amount of feed per animal was 1.2 kg each day and was given in two portions.

After 5 days, the first symptoms of the disease were observed from the thin faeces and confirmed by a microbiological investigation of the faeces and confirmed by a microbiological investigation of the faeces. After a week, the animals were treated as follows:

group 1: no antibiotic was added to the feed;
group 2: 100 ppm of tylosin were added to the feed;
group 3: 25ppm of dihydromocimycin were added to the feed; and
group 4: 50 ppm of dihydromocimycin were added to the feed.

The antibiotic-enriched feed was administered for a week. After that week, feed without any antibiotic was given again. Recovery from the infection was observed from the weights of the animals and from inspection of samples of the faeces, macroscopically from their consistencies, and microscopically by means of a specific immuno-fluoroescence technique. During the test, one animal of each of groups 1, 3 and 4 died.

The results are shown in the following Table wherein the weights indicated are the averages at that time of the still living animals. The consistency of the faeces is indicated as follows:

+ means thin liquid; ± means thick liquid; − means normal. The results of the immuno-fluorescence technique are indicated quantitatively by indicating the number of Treponemas in the visual field: 5 means very crowded; 4 means many; 3 means about 10 Treponemas; 2 means 1 or 2 Treponemas, 1 means more visual fields necessary to find one Treponema, and − means negative.

|  | Group 1 | Group 2 | Group 3 | Group 4 |
|---|---|---|---|---|
| Weights in kg. | | | | |
| just before infection | 24.6 | 24.4 | 24.2 | 23.4 |
| after 1 week (1) | 23.7 | 22.2 | 21.3 | 21.6 |
| after 2 weeks | 20.9 | 21.4 | 20.2 | 21.2 |
| after 3 weeks | 19.8 | 23.2 | 24.0 | 23.0 |
| Faeces consistency | | | | |
| after 1 week | +++++ | ++++− | ++++* | +++++ |
| after 2 weeks | +++++ | ++++± | ±±±+ | ++*++ |
| after 3 weeks | +±±+* | ±+±±± | −−±± | −− +− |
| Immunofluorescence | | | | |
| after 1 week | 4 4 4 4 5 | 4 4 3 4 − | 5 4 5 5 * | 5 − 5 3 3 |
| after 2 weeks | 4 4 4 − 4 | 4 4 2 2 − | 4 4 3 1 | 2 − * 4 1 |
| after 3 weeks | 2 2 2 2 * | 3 − − 2 − | − − − − 1 | − − − − |

(1) at which time the administration of the antibiotics is started
* means: an animal died.

From the faeces consistency as well as from immunofluorescence observations, it appeared that the animals treated with dihydromocimycin were cured markedly faster than the animals treated with tylosin. When the administered amounts of antibiotics were also taken into account, it can be concluded that dihydromocimycin is at least 4 times as active as tylosin.

EXAMPLE VII

Pigs, from a farm where problems with pigs scour had existed for some time, were treated under the supervision of the local veterinary surgeon and the inspector of the Health Service Station. The pigs were divided into groups and treated for 4 days in the following manner.

Group 1: 66 pigs were treated with feed containing 100 ppm of tylosin;
Group 2: 34 pigs were treated with feed containing 25 ppm of dihydromocimycin;
Group 3: 40 pigs were treated with feed containing 50 ppm of dihydromocimycin; and
Group 4: 40 pigs were treated with feed containing 100 ppm of dihydromocimycin.

Before the treatment, all animals lost thin or very thin faeces. Samples thereof were investigated and found to be Treponema-positive, and Salmonella-negative. Sometimes worm eggs were found.

One day after the start of the treatment, the faeces of the pigs of group 4 were normal. The animals of group 1 were cured only after 3 to 4 days. The animals of groups 2 and 3 were cured in periods lying between those of groups 1 and 4. The animals treated with dihydromocimycin appeared to be much more lively than before the treatment. The animals were not averse to feed containing dihydromocimycin and the general conclusion was that a dosage of 25 ppm of dihydromocimycin was better than a dosage of 100 ppm of tylosin in the curing of Treponema dysentery.

EXAMPLE VIII

A solution was made 1 gram of dihydromocimycin in 15 ml of HMPT (technical grade, dried through a molecular sieve 3A) and an amount of 139 mg (1.25 mmoles) of selenium dioxide was added. The mixture was heated on a steam bath for 100 minutes and an additional amount of 139 mg of selenium dioxide was added after 60 minutes. The selenium formed after cooling was separated by filtration through a G4 glass filter and the precipitate was washed with a small amount of methanol. The filtrate was poured into 350 ml of distilled water and the precipitate formed was filtered off and washed with distilled water. The filtrate was stored. The precipitate was dissolved in methanol and diluted with methyl isobutyl ketone (MIK). The solution was evaporated at 40° C under reduced pressure until methanol and water were removed. A precipitate was formed which did not contain mocimycin as indicated by a thin-layer chromatographed (TLC) test and it consisted of polar impurities only. The precipitate was filtered off and washed with MIK. The filtrate was added dropwise to an excess of petroleum ether (fraction boiling at 40° to 60° C) and the precipitate formed was filtered off, washed with petroleum ether and dried to obtain 500 mg of product.

The stored filtrate was extracted with MIK, and the extract was added dropwise to petroleum ether to obtain another 100 mg of product of the same quality so that the total yield was 650 mg. A microbiological activity test showed that the final product contained mocimycin and dihydromocimycin whereas the starting material contained substantially no mocimycin.

EXAMPLE IX

In this Example several solvents were tested to find out which one is preferred for the dehydrogenation of dihydromocimycin. In all experiments, 50 mg of a technical preparation containing dihydromocimycin and mocimycin were reacted with 20 mg (0.18 mmole) of selenium dioxide in 3 ml of solvent at a temperature of 80° C. At 2, 4 and 7 hours after the start, a sample was taken for a thin-layer chromatographic test (if necessary after sample preparation on a "Kieselgel" 60 disc (Merck) using a 50:45:5 mixture of MIK, acetone and water as the eluent). Detection was carried out by carbonization after spraying with a sulfuric acid-diethyl ethr mixture. A qualitative picture of the reaction was obtained in this manner.

The results are as follows: Decomposition or no reaction was obtained in propargyl alcohol, diacetone alcohol, nitromethane, propylene carbonate, acetonitrile, pyridine, sulfolane, benzyl alcohol, mesityl oxide, ethylene carbonate, N-methyl-2-pyrrolidone, N,N-dimethylacetamide, dioxane, MIK, butyl acetate, amyl acetate, N-methylacetamide, anisole, diglyme and 1,2-dichloroethane. A poor conversion was obtained in tetramethyl urea, a 0.1 M buffer NaHCO₃/Na₂CO₃.—pH 9.1, n-propanol, phenylmethylcarbinol, water, and dimethylformamide. A somewhat better conversion was obtained in methylcellosolve, isopropanol, n-butanol, hexylene glycol, sec-butanol and t-amyl alcohol. A moderate conversion was obtained in t-butanol and dimethyl sulfoxide and the best results was obtained in HMPT.

EXAMPLE X

In this Example, mixtures of solvents with HMPT as one of the components were tested to find out the preferred mixture for carrying out the dehydrogenation of dihydromocimycin.

In each of the experiments 2.4 grams of the preparation as used as the starting material in Example 2 were used. After the reaction (i.e. after all dihydromocimycin was converted according to a TLC test), the reaction mixtures were recovered as follows:

After cooling, the reaction mixture was filtered over a G4 glass filter to remove the selenium formed and the filter was washed with a small amount of methyl alcohol. The filtrate was poured into an excess of water and was acidified to pH 3, and was extracted three times with ⅓ of its volume of MIK. A tar-like interlayer which was formed was extracted with MIK again by dissolving it in methanol first and diluting it with MIK and water thereafter. The combined MIK extracts were washed three times with ⅓ of its volume of water, and the organic layer was concentrated in vacuo at about 40° C. In all cases, a precipitate was formed essentially consisting of decomposition products (according to TLC). The precipitate was filtered and washed with MIK and the combined MIK concentrates were added slowly, with stirring, to an excess of petroleum ether (40° to 60° C) the precipitate formed was filtered, washed with petroleum ether and dried. The results of the experiments are shown in the following table:

| Amount of solvent | Reaction temp. (° C.) | Overall reaction time (hrs) | SeO₂-addition in grams and time of addition after start of reaction | Yield (% by weight) | Moles SeO₂ added per mole of mixture |
|---|---|---|---|---|---|
| HMPT 25ml H₂O 35ml | 90 | 2 | 0.5 start | 42 | 3:1 |
| HMPT 15ml 0.1 M NaHCO₃- Na₂CO₃ buffer pH 9.1 25ml. | 90 | 2¾ | 0.1 start 0.1 after 20 min 0.1 after 85 min 0.1 after 130 min | 50 | 1.2:1 |
| t-BuOH 20 ml HMPT 10 ml | 84 | 3 | 0.1 start 0.1 after 25 min 0.1 after 45 min 0.1 after 75 min 0.1 after 120 min | 42 | 1.5:1 |
| t-AmOH 100ml HMPT 50ml | 96 | 3 | 0.35 start 0.35 after 70 min 0.35 after 110 min | 71 | 3.2:1 |
| t-AmOH 150 ml | 96 | 3 | 0.35 start 0.35 after 75 min 0.35 after 150 min | 55 | 3.2:1 |
| t-BuOH 100 ml HMPT 50 ml | 80 | 2 | 1.0 start 1.0 after 35 min | 42 | 6:1 |
| HMPT 150ml | 95 | reaction stopped after 1 hr | 0.4 start | 79 | 1.2:1 |

The table shows that the highest yield (79%) is obtained when pure HMPT is used as the solvent. A high yield is also obtained in a mixture of HMPT and t-amyl alcohol.

Various modifications of the composition and methods of the invention may be made without departing from the spirit or scope thereof and it is to be understood that the invention is to be limited only as defined in the appended claims.

We claim:

1. A compound selected from the group consisting of dihydromocimycin of the formula

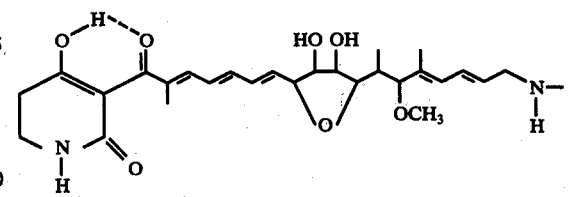

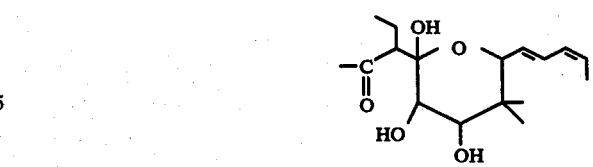

and its non-toxic, pharmaceutically acceptable salts.

2. A compound of claim 1 wherein the salt is an alkali metal salt, ammonium salt or an amine salt.

3. A composition of pig feedstuffs useful against Treponema dysentery comprising pig feedstuffs supplemented by a significant proportion of at least one active compound of claim 1.

4. The composition of claim 3 wherein about 10 to about 200 ppm of the active compound based on the weight of the feed, is added.

5. The composition of claim 3 wherein 20 to 40 ppm of the active compound based on the weight of the feed, is added.

6. A method of protecting pigs from Treponema disease comprising administering to pigs suffering from Treponema disease an effective amount of at least one active compound of claim 1.

7. The method of claim 6 wherein the active compound is contained in the feedstuff which is administered orally.

8. The method of claim 6 wherein a salt of the active compound is administered to the pigs as a solution in drinking water.

9. Process according to claim 6 wherein the active compound suspended or dissolved in a suitable solvent, is administered by injection.

10. A process for the dehydrogenation of dihydromocimycin of the formula

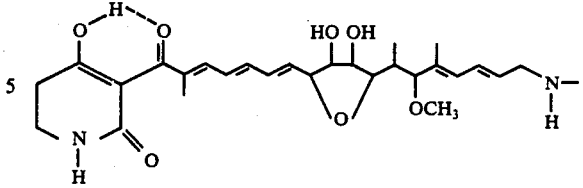

into mocimycin comprising the step of reacting dihydromocimycin in a solvent selected from the group consisting of hexamethylphosphortriamide, dimethyl sulfoxide, t-butanol, t-amyl alcohol, sec-butanol, hexylene glycol, n-butanol, isopropanol, methylcellosolve, dimethylformamide, phenylmethylcarbinol, propanol and mixtures of two or more of those solvents with selenium dioxide to dehydrogenate the pyridone nucleus.

11. The process of claim 10 wherein a mixture of mocimycin and dihydromocimycin is used as the starting material.

12. The process of claim 10 wherein the reaction is carried out at a temperature between about 65° and about 110° C.

13. The process of claim 10 wherein the reaction is carried out at a temperature between 80° and 95° C.

14. The process of claim 10 wherein the reaction is carried out in a solvent selected from the group consisting of hexamethylphosphortriamide, dimethylsulfoxide and t-butanol.

15. The process of claim 10 wherein the reaction is carried out in hexamethylphosphortriamide as a solvent.

16. A method of combatting treponema bacteria, compising administering to livestock a bactericidally effective amount of at least one compound of claim 1.

* * * * *